US009172781B1

(12) United States Patent
Goldstein

(10) Patent No.: US 9,172,781 B1
(45) Date of Patent: Oct. 27, 2015

(54) WATERPROOF ACOUSTIC CHAMBERS FOR SMARTPHONES

(71) Applicant: Avraham Goldstein, Flushing, NY (US)

(72) Inventor: Avraham Goldstein, Flushing, NY (US)

(*) Notice: Subject to any disclaimer, the term of this patent is extended or adjusted under 35 U.S.C. 154(b) by 213 days.

(21) Appl. No.: 14/047,472

(22) Filed: Oct. 7, 2013

(51) Int. Cl.
| H04M 1/03 | (2006.01) |
| H04B 1/38 | (2015.01) |
| H04M 1/02 | (2006.01) |
| H04B 1/3888 | (2015.01) |

(52) U.S. Cl.
CPC ............. H04M 1/035 (2013.01); H04B 1/3888 (2013.01); H04M 1/0202 (2013.01); *H04B 2001/3894* (2013.01)

(58) Field of Classification Search
CPC ................ H04M 1/035; H05B 1/3888; H05B 2001/3894
USPC ........ 455/575.8; 361/679.3, 679.56; 181/179, 181/198, 202
See application file for complete search history.

(56) References Cited

U.S. PATENT DOCUMENTS

| 7,778,431 | B2 * | 8/2010 | Feng et al. ..................... 381/160 |
| 8,014,843 | B2 * | 9/2011 | Birch et al. ................. 455/575.4 |
| 8,170,259 | B2 * | 5/2012 | Liu ................................ 381/365 |
| 8,256,568 | B2 * | 9/2012 | Lin ................................ 181/179 |
| 8,320,597 | B2 * | 11/2012 | Griffin et al. ................. 381/339 |
| D689,476 | S  * | 9/2013 | Alexander .................... D14/252 |
| 8,528,690 | B1 * | 9/2013 | Wu ................................ 181/179 |
| 8,596,412 | B1 * | 12/2013 | Jorgensen ..................... 181/205 |
| 8,644,011 | B2 * | 2/2014 | Parkinson ................ 361/679.09 |
| 8,767,992 | B2 * | 7/2014 | Lester, Jr. ..................... 381/338 |
| D714,282 | S  * | 9/2014 | Cheon .......................... D14/252 |
| 8,861,714 | B1 * | 10/2014 | Leibenhaut et al. .......... 379/449 |
| 8,929,068 | B2 * | 1/2015 | Richardson ............... 361/679.55 |
| 8,971,974 | B2 * | 3/2015 | Weaver, III ................. 455/575.8 |
| 8,976,512 | B2 * | 3/2015 | Richardson et al. ..... 361/679.01 |
| 8,995,127 | B2 * | 3/2015 | Richardson .............. 361/679.56 |
| 9,027,701 | B2 * | 5/2015 | Center et al. .................. 181/202 |
| 9,033,099 | B2 * | 5/2015 | Center et al. .................. 181/202 |
| 9,062,812 | B2 * | 6/2015 | Tsai ..................................... 1/1 |
| 2002/0009195 | A1 * | 1/2002 | Schon .......................... 379/454 |
| 2009/0184145 | A1 * | 7/2009 | Yeh ............................... 224/400 |
| 2010/0219012 | A1 * | 9/2010 | Baumbach .................... 181/177 |
| 2011/0170725 | A1 * | 7/2011 | Liu ............................... 381/338 |
| 2012/0024619 | A1 * | 2/2012 | Lin ............................... 181/179 |
| 2012/0027237 | A1 * | 2/2012 | Lin ............................... 381/340 |
| 2012/0237058 | A1 * | 9/2012 | Salomaa et al. .............. 381/111 |
| 2012/0303146 | A1 * | 11/2012 | Genov et al. .................... 700/94 |

(Continued)

FOREIGN PATENT DOCUMENTS

JP         2012175696 A  *  9/2012

*Primary Examiner* — John Villecco

(57) ABSTRACT

A waterproof acoustic chamber that is adapted to hold and protect a smartphone is disclosed. The chamber includes a body portion that is configured to encapsulate a smartphone, which exhibits an internal dimension that accommodates, at a user's option, a smartphone with (or without) its own protective casing. The body portion is configured to prevent water from entering an internal area of the body portion when exposed to water. The body portion includes at least one speaker area that includes a material through which audio content that is generated by the smartphone may leave the body portion. The chamber further includes a compartment having an open side that is configured to receive and attach to the backside of the body portion. The compartment includes two sides that each extend beyond a parallel side of the body portion, with the speaker area and compartment being effective to amplify and channel the audio content that is generated by the smartphone.

18 Claims, 4 Drawing Sheets

(56) References Cited

U.S. PATENT DOCUMENTS

| | | | |
|---|---|---|---|
| 2013/0045782 A1* | 2/2013 | Simmer | 455/575.8 |
| 2013/0048413 A1* | 2/2013 | Patzer | 181/199 |
| 2013/0070948 A1* | 3/2013 | Lee et al. | 381/334 |
| 2013/0236044 A1* | 9/2013 | Hsu | 381/334 |
| 2014/0057685 A1* | 2/2014 | Shih | 455/575.1 |
| 2014/0174846 A1* | 6/2014 | Molinaro | 181/177 |
| 2014/0183321 A1* | 7/2014 | Tsai | 248/371 |
| 2014/0228081 A1* | 8/2014 | Chang | 455/575.8 |
| 2015/0027802 A1* | 1/2015 | Altschul et al. | 181/177 |
| 2015/0131836 A1* | 5/2015 | Hoshikawa | 381/345 |

* cited by examiner

WATERPROOF ACOUSTIC CHAMBERS FOR SMARTPHONES

FIELD OF THE INVENTION

The field of the present invention relates to a waterproof acoustic chamber that is adapted to hold and protect a smartphone. More particularly, the field of the present invention relates to acoustic chambers that are adapted to hold and protect a smartphone (with or without its own protective casing), which are also waterproof and configured to protect the encased smartphone when exposed to water or steam (e.g., in a shower, bath, or sauna environment).

BACKGROUND OF THE INVENTION

Smartphones have become a necessary and ubiquitous part of every person's life. In addition to being used as a means for communication, e.g., e-mail, texting, and telephone conversations, smartphones are routinely used as a source of entertainment. For example, it is not uncommon for people to use a smartphone to consume various forms of media, such as music, video content, and audio books.

Most people will protect their smartphones by applying a protective cover or casing to the phone. These protective casings may be hard or soft, and will often encapsulate and serve to protect the phone from damage that may arise from dropping the phone. While these existing protective casings do provide some level of protection from mechanical damage, the casings often do not protect the phone from water damage. With respect to the few currently-available cases that purport to be waterproof, those cases often do not provide a suitable means for allowing the audio content that is generated by the phone to leave the case for a user to consume. In some cases, it may be desirable for a user to operate a smartphone in wet conditions, e.g., in the shower or bath, while being able to hear and interpret the audio content that is generated by the smartphone.

In view of the foregoing, it would be advantageous to provide a protective chamber that may be used to hold and protect the smartphone that is not only waterproof, but is also configured to enable a user to hear and interpret the audio content that is generated by the smartphone (e.g., the audio content included within a song, video, or audio book). In addition, it would be advantageous to provide a protective smartphone chamber, which not only enables a user to consume the audio content that is generated by the smartphone, but is also configured to amplify such audio content (since the environment in which the smartphone may be used will often exhibit a higher background level of noise, e.g., a shower or bathtub). Still further, it would be advantageous to provide a protective smartphone chamber, which not only exhibits the above features, but is also configured to accommodate a smartphone by itself—or a smartphone that is already equipped with its own protective casing—such that the waterproof chamber will only be needed when the environment requires it. These features would be particularly useful when a person wishes to use a smartphone during a shower or bath, and wishes to simply drop the smartphone into an acoustic waterproof chamber as described above.

As the following will demonstrate, the present invention addresses many of these needs and others.

SUMMARY OF THE INVENTION

According to certain aspects of the present invention, an acoustic waterproof chamber is provided that is adapted to hold and protect a smartphone. The acoustic waterproof chamber will preferably comprise a body portion that is configured to hold and encapsulate a smartphone, either with or without its own protective casing or sleeve. The body portion is preferably configured to be waterproof, such that the body portion will be able to prevent water from entering an internal area of the body portion (where the smartphone is held) when subjected to water or steam (e.g., in a shower, bath, or sauna environment). In addition, the body portion of the chamber will include at least one speaker area, which comprises a material through which audio content that is generated by the smartphone may leave the body portion. More particularly, the invention provides that the speaker area will preferably comprise a micro-mesh material, which is attached to the backside of the body portion in a manner that creates a watertight seal around the micro-mesh material (which may be achieved using, for example, a bezel to attach the material to the surrounding parts of the body portion), while simultaneously permitting audio content (generated by the smartphone) to exist the body portion of the waterproof chamber.

The acoustic waterproof chamber of the present invention further includes a compartment that is configured to receive and attach to the backside of the body portion described above. More particularly, the compartment will preferably exhibit a concave shape, with the concave open side of the compartment being attached to the backside of the body portion. The compartment will further include two sides, each of which extends beyond an adjacent parallel side of the body portion. The invention provides that the concave open side of the compartment will receive the audio content through the speaker area of the body portion, and then channel such audio content through and out of the compartment. The audio content will exit the compartment through (i) a first area between a first side of the compartment and an adjacent first side of the body portion (which is parallel to the first side of the compartment) and (ii) a second area between a second side of the compartment and an adjacent second side of the body portion (which, similarly, is parallel to the second side of the compartment). The invention provides that such configuration, along with the material used to form the speaker area, will preferably be effective to amplify the audio content that is generated by the smartphone (without the aid of additional electricity).

According to further aspects of the invention, the waterproof acoustic chamber described herein will include a transparent face (or cover) located at the front side of the chamber. The invention provides that the transparent face is preferably configured to open and close about a rotatable axis located at a first end of the face. In addition, the transparent face is preferably configured to be locked into a closed position through a latch that is located at a second end (which is opposite of the first end of the transparent face). Still further, the invention provides that the body portion may include one or more gaskets, seals, and other components, which are effective to render the body portion waterproof. For example, the invention provides that a gasket may be located between the transparent face and each of four sides of the body portion, which helps to create a watertight seal when the transparent face is locked in a closed position.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 1:
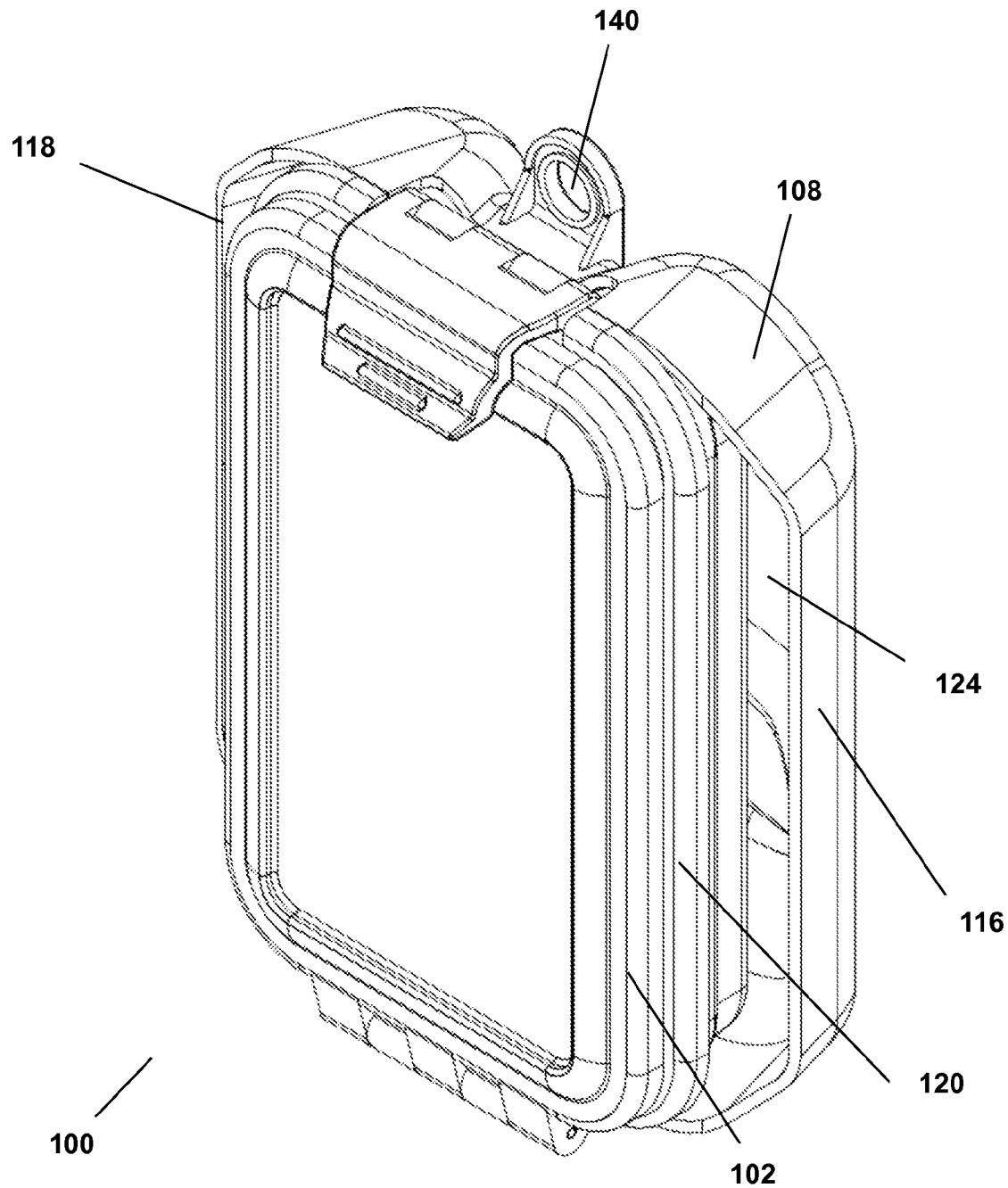
FIG. 1: a perspective side view of the waterproof acoustic chamber of the present invention.
Figure 2:
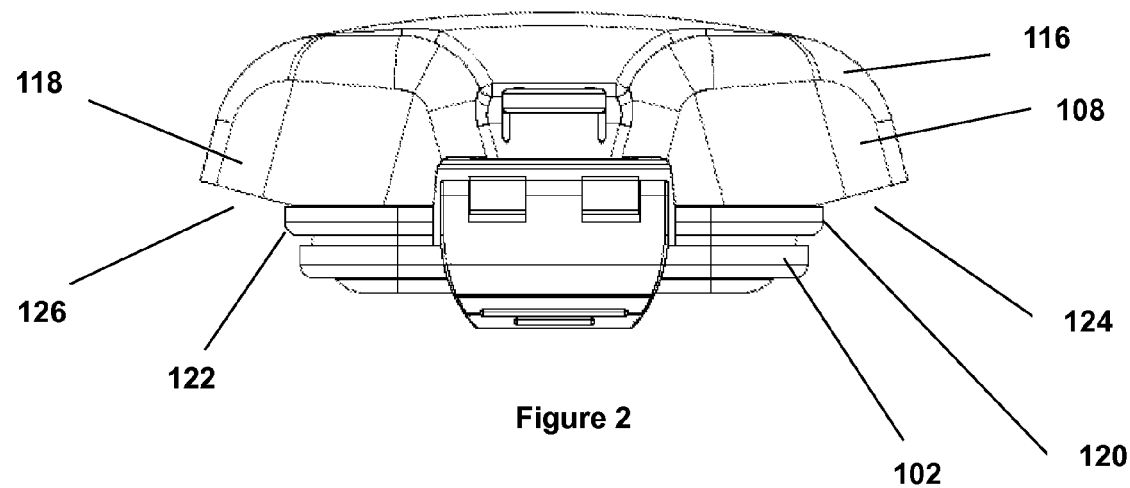
FIG. 2: a top side view of the waterproof acoustic chamber of the present invention.
Figure 3:
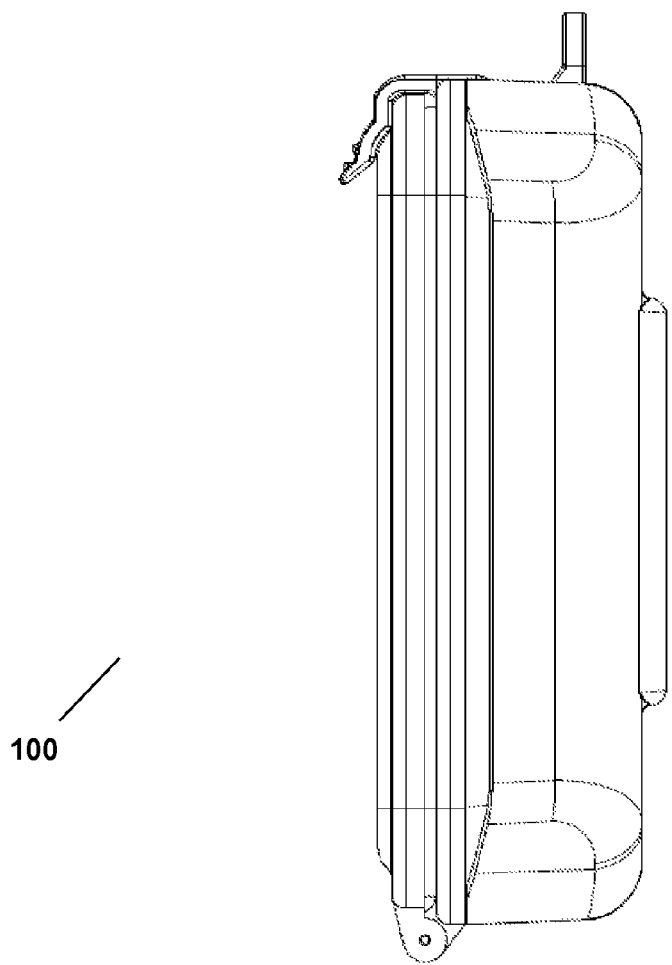
FIG. 3: a side view of the waterproof acoustic chamber of the present invention.
Figure 4:
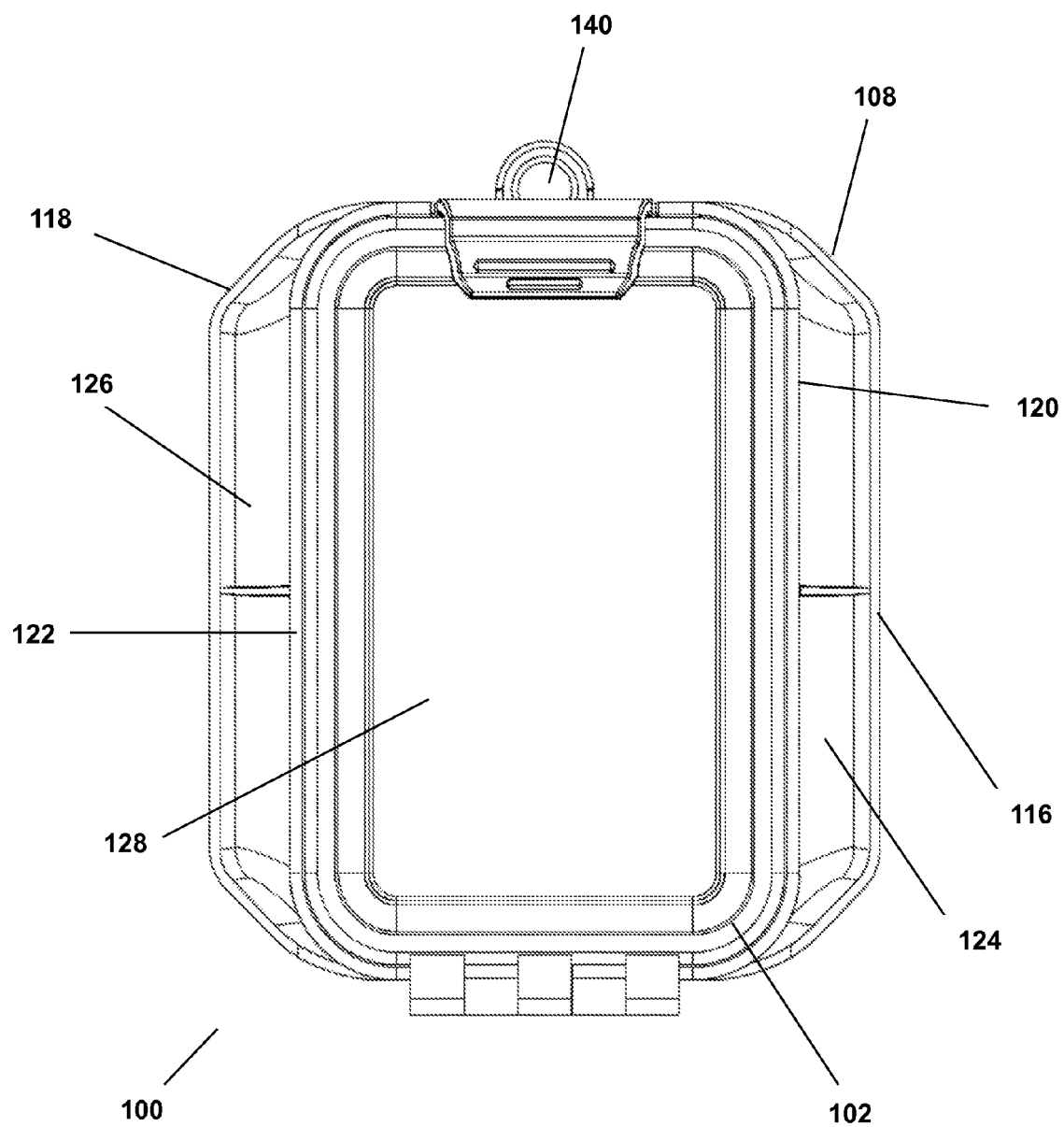
FIG. 4: a front side view of the waterproof acoustic chamber of the present invention.
Figure 5:
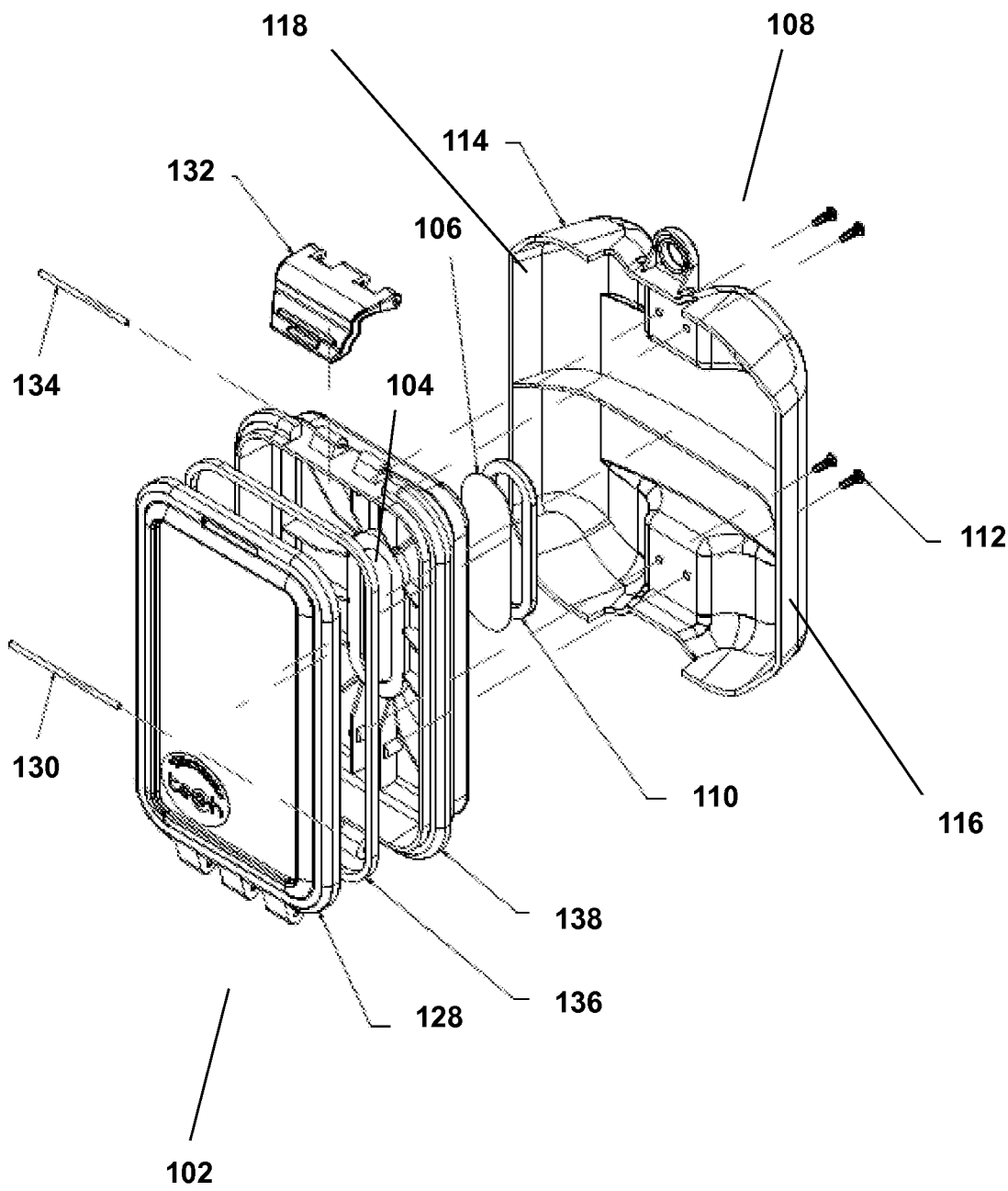
FIG. 5: a disassembled perspective view of the waterproof acoustic chamber of the present invention, which illustrates the various components of the chamber.

Referring to FIGS. 1-5, according to certain preferred embodiments of the present invention, a waterproof acoustic chamber 100 is provided that is adapted to hold and protect a smartphone. The chamber will preferably comprise a body portion 102 that is configured to hold and encapsulate a smartphone. Importantly, the invention provides that the body portion 102 will comprise an internal dimension (volume) that may hold and encapsulate most (if not all) commercially-available smartphones, either with or without its own protective casing or sleeve. More particularly, the body portion 102 will comprise an internal (hollow) area that is configured (and will exhibit a sufficient volume) to receive any smartphone, either by itself or when the smartphone is already equipped with a protective casing. This way, the waterproof acoustic chamber of the present invention may be utilized when desired, without having to remove a casing that may have already been applied to the smartphone.

According to certain preferred embodiments of the present invention, the body portion 102 is preferably configured to be waterproof, such that the body portion 102 is able to prevent water from entering an internal area of the body portion 102 when submerged in (or exposed to) water. The waterproof body portion 102 will allow the waterproof acoustic chamber 100 (and the smartphone contained therein) to be used in a variety of extreme environments. In particular, the invention provides that the waterproof acoustic chamber 100 (and the smartphone contained therein) may be safely and effectively used during a shower or bath, in a sauna, or in other environments in which it will be necessary to keep water or steam from penetrating (and potentially destroying) the smartphone. The invention provides that the body portion 102 may be comprised of plastic materials, steel, elastomers, or combinations thereof.

According to additional preferred embodiments of the present invention, the body portion 102 of the waterproof acoustic chamber will include at least one speaker area 104. More particularly, the at least one speaker area 104 will comprise an area through which audio content (sound waves) that is generated by the smartphone may exit the body portion 102. According to certain preferred embodiments, the speaker area 104 will comprise a material 106 through which audio content that is generated by the smartphone may leave the body portion 102. More particularly, the invention provides that the speaker area 104 may comprise a micro-mesh material 106, which may be manufactured from polyesters, nylon, or other suitable materials. Preferably, however, the micro-mesh material 106 will be configured to prevent the entry of water into the interior of the body portion 102, but still permit sound waves (audio content) to exit the body portion 102 for consumption by a user of the smartphone.

Although the at least one speaker area 104 may be located in any of various areas of the body portion 102, in certain preferred embodiments, the speaker area 104 will be located in the backside of the body portion 102. More particularly, the speaker area 104 will be positioned, in the backside of the body portion 102, such that the audio content is channeled directly into a separate compartment 108 (described below) of the waterproof acoustic chamber 100. The invention provides that the micro-mesh material 106 that forms the speaker area 104 is, preferably, attached to the backside of the body portion 102 in a manner that creates a watertight seal around the material 106. For example, in certain embodiments, the material 106 may be attached to the backside of the body portion 102 with a bezel 110 (which surrounds the material 106 and creates a watertight seal between the material 106 and the surrounding parts of the body portion 102).

According to further preferred embodiments of the present invention, the waterproof acoustic chamber 100 will comprise a separate compartment 108 that is configured to receive and be attached to the backside of the body portion 102. For example, the compartment 108 may be attached to the backside of the body portion 102 through a set of screws 112 and corresponding threaded apertures in the compartment 108 and body portion 102. Alternatively, the compartment 108 may be attached to the backside of the body portion 102 through other means, such as mechanical snaps or latches, adhesives, welding, or such components may be integrally formed with each other. The invention provides that the compartment 108 may be comprised of various types of plastic materials, steel, elastomers, or combinations thereof.

According to certain preferred embodiments of the present invention, the compartment 108 will exhibit a concave shape. That is, the compartment 108 will have a concave shape that is formed by a wall 114 that surrounds the perimeter of the compartment 108, and projects towards the body portion 102. The invention provides that the wall 114 is preferably configured to exhibit a curved contour, with the wall 114 curving towards the body portion 102. As described further below, such configuration will enhance the channeling, and amplification of, the audio content that is generated by the smartphone.

The invention further provides that the wall 114 will include two sides (116,118), each of which extends beyond an adjacent parallel side (120,122) of the body portion 102. According to such embodiments, the invention provides that the concave open side of the compartment 108 will receive the audio content (which is generated by the smartphone) through the speaker area 104, and then channel such audio content out of the compartment 108. The audio content will exit the compartment 108 through (i) a first area 124 between a first side 116 of the compartment 108 and an adjacent first side 120 of the body portion 102 (which is parallel to the first side 116 of the compartment 108) and (ii) a second area 126 between a second side 118 of the compartment 108 and an adjacent second side 122 of the body portion 102 (which is parallel to the second side 118 of the compartment 108). The invention provides that such configuration, along with the micro-mesh material 106 used to form the speaker area 104, will be effective to amplify the audio content that is generated by the smartphone (without the aid of additional electricity). In addition, the invention provides that such configuration will be effective to channel and direct such audio content towards a person who is facing the front of the waterproof acoustic chamber 100 (and the smartphone contained therein).

According to further embodiments of the invention, the waterproof acoustic chamber 100 will include a transparent face (or cover) 128 located at the front side of the chamber 100. The transparent face (or cover) 128 will preferably allow a user to view the user interface of the smartphone contained within the waterproof acoustic chamber 100. The transparent face 128 may be comprised of various transparent or semi-transparent plastics, such as polystyrenes. The invention provides that the transparent face 128 is preferably configured to open and close about a rotatable axis located at a first end of the face 128. More particularly, the invention provides that the transparent face 128 may comprise an axis 130 at a first end of the face 128, which allows the face 128 to rotate to an open and closed position. This permits a user to open the face 128, position a smartphone within the interior area of the body portion 102, and then close the face 128 to encapsulate the smartphone (and, similarly, allow the user to remove the smartphone when the waterproof acoustic chamber 100 is no longer required).

According to further preferred embodiments, the invention provides that the transparent face 128 is configured to be locked into a closed position through a latch 132 that is located at a second end (which is opposite of the first end) of the transparent face 128. More particularly, the invention provides that the latch 132 may be opened and closed about a rotatable axis 134. For example, the latch 132 may be pulled open about the axis 134, which allows the face 128 to rotate about the axis 130 located at the opposite end. When desired, the face 128 may also be rotated about the axis 130 to a closed position, such that the latch 132 may be pushed over the face 128 and mechanically locked into a closed position.

Still further, the invention provides that the body portion 102 may include one or more gaskets, seals, and other components, which are effective to assist in rendering the body portion 102 waterproof. For example, the invention provides that a gasket 136 may be located between the transparent face 128 and each of four sides 138 of the body portion 102, which helps to create a watertight seal when the transparent face 128 is locked in a closed position. The gasket 136 may be comprised of a rubber material, elastomers, or other flexible materials that may facilitate creating a watertight seal at the junction of the transparent face 128 and the four sides 138 of the body portion 102.

In addition, the invention provides that the waterproof acoustic chamber 100 may comprise an aperture 140 located near a top portion thereof, which may be used to hang the waterproof acoustic chamber 100 (and the smartphone contained therein) from a hook, loop, or other element, e.g., from a hook or loop that may be a part of a shower caddy (so that the waterproof acoustic chamber 100 may simply be positioned in front of a user during a shower). Still further, in certain embodiments, the waterproof acoustic chamber 100 may be equipped with one or more suction cups, located on the backside of the waterproof acoustic chamber 100. This way, in a shower or bath environment, a user may reversibly attach the waterproof acoustic chamber to a wall.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A waterproof acoustic chamber that is adapted to hold and protect a smartphone, which comprises:
   (a) a body portion that is configured to hold and encapsulate a smartphone, wherein the body portion (i) exhibits an internal dimension that accommodates, at a user's option, a smartphone or a smartphone that comprises a protective casing; (ii) is configured to prevent water from entering an internal area of the body portion when exposed to water; and (iii) at least one speaker area that comprises a material through which audio content that is generated by the smartphone may leave the body portion; and
   (b) a compartment that is configured to receive and attach to a backside of the body portion, wherein the compartment includes (i) an open side that attaches to the backside of the body portion and (ii) two sides that each extend beyond a parallel side of the body portion, wherein the speaker area and compartment are, collectively, effective to amplify the audio content that is generated by the smartphone.

2. The waterproof acoustic chamber of claim 1, wherein the compartment exhibits a concave shape.

3. The waterproof acoustic chamber of claim 2, wherein the speaker area comprises a micro-mesh material.

4. The waterproof acoustic chamber of claim 3, wherein the speaker area is located in the backside of the body portion.

5. The waterproof acoustic chamber of claim 4, wherein the micro-mesh material of the speaker area is attached to the backside of the body portion with a bezel.

6. The waterproof acoustic chamber of claim 5, wherein the compartment:
   (a) receives the audio content through the speaker area; and
   (b) channels the audio content out of the compartment through (i) a first area between a first side of the compartment and a first side of the body portion that is parallel to the first side of the compartment and (ii) a second area between a second side of the compartment and a second side of the body portion that is parallel to the second side of the compartment.

7. The waterproof acoustic chamber of claim 6, which comprises a transparent face located at a front side of the chamber.

8. The waterproof acoustic chamber of claim 7, wherein the transparent face is configured to:
   (a) open and close about a rotatable axis located at a first end of the face; and
   (b) be locked into a closed position through a latch that is located at a second end that is opposite of the first end of the transparent face.

9. The waterproof acoustic chamber of claim 8, which comprises a gasket located between the transparent face and each of four sides of the body portion.

10. A waterproof acoustic chamber that is adapted to hold and protect a smartphone, which comprises:
   (a) a body portion that is configured to hold and encapsulate a smartphone, wherein the body portion (i) is configured to prevent water from entering an internal area of the body portion when exposed to water; and (ii) at least one speaker area that comprises a material through which audio content that is generated by the smartphone may leave the body portion; and
   (b) a compartment that is configured to receive and attach to a backside of the body portion, wherein the compartment includes (i) an open side that attaches to the backside of the body portion and (ii) two sides that each extend beyond a parallel side of the body portion, wherein the speaker area and compartment are, collectively, effective to amplify the audio content that is generated by the smartphone.

11. The waterproof acoustic chamber of claim 10, wherein the compartment exhibits a concave shape.

12. The waterproof acoustic chamber of claim 11, wherein the speaker area comprises a micro-mesh material.

13. The waterproof acoustic chamber of claim 12, wherein the speaker area is located in the backside of the body portion.

14. The waterproof acoustic chamber of claim 13, wherein the micro-mesh material of the speaker area is attached to the backside of the body portion with a bezel.

15. The waterproof acoustic chamber of claim 14, wherein the compartment:
 (a) receives the audio content through the speaker area; and
 (b) channels the audio content out of the compartment through (i) a first area between a first side of the compartment and a first side of the body portion that is parallel to the first side of the compartment and (ii) a second area between a second side of the compartment and a second side of the body portion that is parallel to the second side of the compartment.

16. The waterproof acoustic chamber of claim 15, which comprises a transparent face located at a front side of the chamber.

17. The waterproof acoustic chamber of claim 16, wherein the transparent face is configured to:
 (a) open and close about a rotatable axis located at a first end of the face; and
 (b) be locked into a closed position through a latch that is located at a second end that is opposite of the first end of the transparent face.

18. The waterproof acoustic chamber of claim 17, which comprises a gasket located between the transparent face and each of four sides of the body portion.

\* \* \* \* \*